United States Patent [19]
Saget
[11] Patent Number: 4,478,718
[45] Date of Patent: * Oct. 23, 1984

[54] CENTRIFUGAL SEPARATION APPARATUS

[76] Inventor: Pierre Saget, 36 Avenue de La Grande Armee, 75017 Paris, France

[*] Notice: The portion of the term of this patent subsequent to Nov. 30, 1999 has been disclaimed.

[21] Appl. No.: 405,745

[22] Filed: Aug. 4, 1982

Related U.S. Application Data

[63] Continuation-in-part of Ser. No. 199,863, Oct. 23, 1980, Pat. No. 4,361,490.

[30] Foreign Application Priority Data

Oct. 31, 1979 [FR] France ..... 79 27079

[51] Int. Cl.3 ..... B01D 45/00
[52] U.S. Cl. ..... 210/512.3; 55/406; 209/144
[58] Field of Search ..... 55/1, 177, 191, 204, 55/205, 392, 394, 396, 397, 398, 406, 408; 209/144; 210/787, 512.3

[56] References Cited

U.S. PATENT DOCUMENTS

| | | | |
|---|---|---|---|
| 2,236,358 | 3/1941 | Allardice | 55/398 |
| 2,991,844 | 7/1961 | Normar | 55/408 |
| 3,271,929 | 9/1966 | Bowden | 55/203 |
| 4,361,490 | 11/1982 | Saget | 55/1 |

FOREIGN PATENT DOCUMENTS

| | | | |
|---|---|---|---|
| 296327 | 2/1954 | Switzerland | 209/144 |
| 404519 | 4/1974 | U.S.S.R. | 209/144 |

*Primary Examiner*—Bernard Nozick

[57] ABSTRACT

The invention relates to a process for multiple centrifugal separation of a mixture of phases and to an apparatus for carrying such process out. The invention is applicable to a mixture of phases of any states, said apparatus comprising, disposed coaxially and moved in rotation in a fixed enclosure, a fan adapted to create a depression upstream, a rotary distributor converting the pressure drop resulting from the action of the fan on the upstream pressure into a speed of rotation of the mixture added in the same direction to the positive speed of rotation of said distributor, and a rotor comprising elements for guiding running streams and defining still layers adjacent to and outside of such running streams. Heavy particles located in the still layers are conducted out of the device.

6 Claims, 14 Drawing Figures

FIG. 7
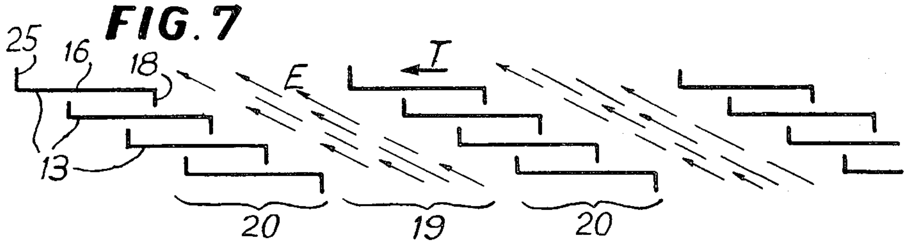
FIG. 8
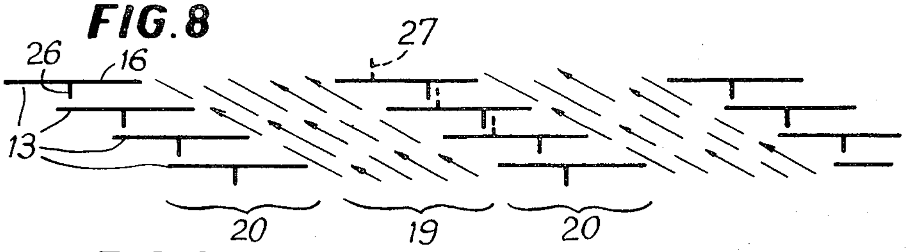
FIG. 9
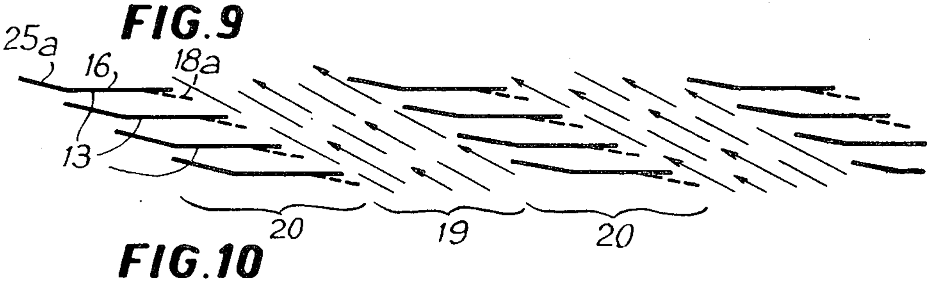
FIG. 10
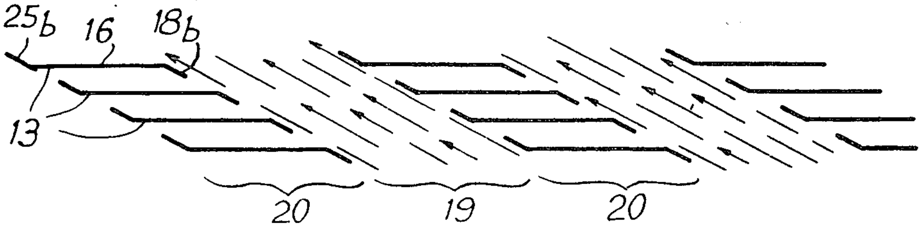
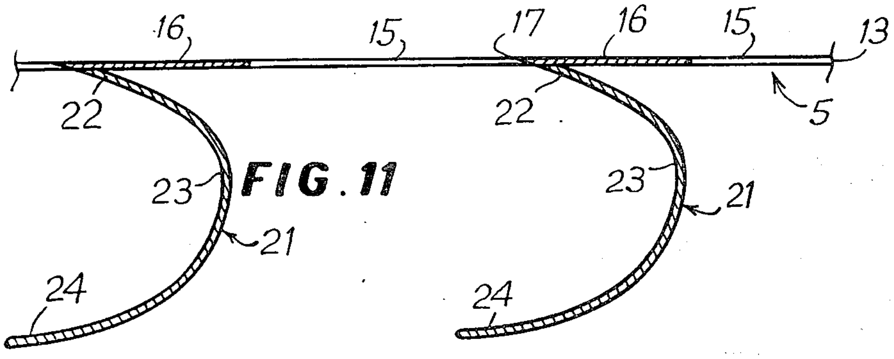
FIG. 11

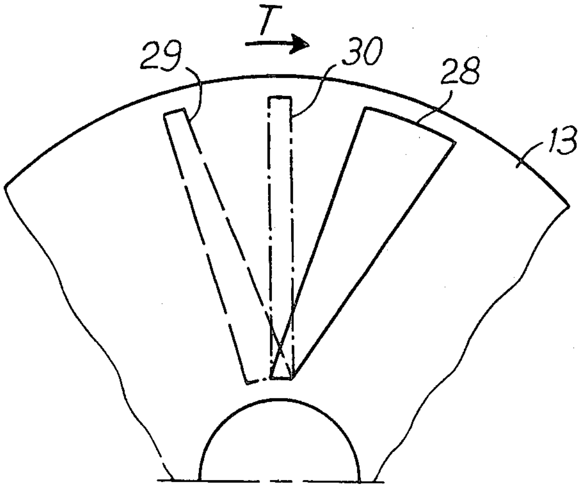
FIG.13
FIG.14
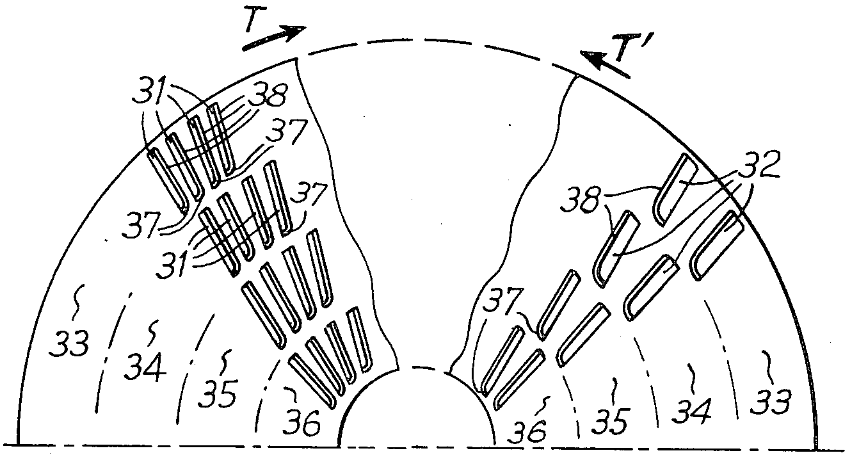

CENTRIFUGAL SEPARATION APPARATUS

The present application is a continuation-in-part of application Ser. No. 199,863, filed Oct. 23, 1980 now U.S. Pat. No. 4,361,490.

BACKGROUND OF THE INVENTION

The present invention relates to a process for the centrifugal separation of a mixture of phases of any states: gas in gas, liquid in gas, pulverulent solid in gas, liquid in liquid, pulverulent solid in liquid, or other combinations of the three phases. It also relates to an apparatus for carrying out this process and, more especially, to a particular embodiment of said apparatus.

While centrifugal separators are known, none of the known centrifugal separators perform a plurality of centrifugal separations on fluid flowing therethrough, and none are capable of separating a wide range of phases. These known devices are particularly ineffective, if not completely useless, in separating two close phases, such as gas-gas, mist-gas, very fine particles (such as dust, fog, cloud size particles, or the like)-gas, or the like.

OBJECTS OF THE INVENTION

It is an object of the present invention to create in the mixture an extremely intense centrifugal field which is much greater than the one to which an element rotating with respect to the mixture and participating in the treatment is subjected. Consequently, manufacture of this rotating element is simplified and economical techniques not in common use in the domain of centrifugation may be employed, for example, the moulding of rotating pieces of plastics material. Depending on the chosen reference frame, the fluid rotates with respect to stationary elements, or the elements rotate with respect to the fluid.

A further object of the invention is to obtain an excellent separation of the phases, even when their specific masses are very low and close to one another, as well as their perfect evacuation in separate phases out of the centrifugation zone.

Another object of the invention is to recover a considerable part of the kinetic energy of centrifugation, with a view to reducing the overall consumption of energy and thus to improve the economical yield of the treatment.

A further object of the invention is to create, by thermodynamic effect, a cooling within the mass in movement, which may be beneficial, particularly for condensing a vapor phase.

SUMMARY OF THE INVENTION

The present invention proposes to this end a process for centrifugal separation, consisting in that: the mixture is rotated at an angular speed greater than that of a rotating element which this mixture must pass through; the mixture is divided into a plurality of streams flowing along helical paths through the rotating element and at an absolute tangential speed obviously higher than that of the latter; these running streams are separated by intermediate, helical, fluid layers defined by the rotating element; the or each heavy phase ejected from the running streams are first collected in these fluid layers; the or each heavy phase collected in the fluid layer and subjected to the centrifugal field prevailing in the latter, obviously being less than the one established in the streams, is directed towards the periphery; and the or each heavy phase directed in the fluid layers are guided positively by said mobile element.

Subsidiarily, the mixture is subjected, for its upstream rotation, on the one hand to the positive action of the rotating element, and, on the other hand, to a downstream axial suction or to an upstream axial delivery through this element, the upstream drop in pressure which results therefrom being converted into a helical speed of which the tangential component is added to the tangential speed of said rotating element and of which the axial component creates the rate of flow.

In addition, the helical flow of the mixture is straightened downstream to be converted into an absolute axial flow and the knietic energy of rotation of the treated mixture is recovered to rotate the rotating element and thus reduce the power consumed thereby.

The invention also relates to an apparatus for carrying out this process and comprising, disposed coaxially and moved in rotation in a fixed enclosure: a first device constituted by a fan, a compressor or pump, adapted to produce a pressure gradient in the housing with a depression upstream; a second device constituted by a rotating distributor converting the drop in pressure which results from the action of the first device on the upstream pressure into a speed of rotation of the mixture added in the same direction to the positive speed of rotation of said distributor; and a third device located downstream of the second and constituted by a rotor comprising elements for guiding the running streams which direct and channel the latter over at least a part of their path, elements which define the fluid layers and collect the or each heavy phase, subsidiarily conducting elements which participate positively in the guiding of the or each heavy phase towards the periphery.

Subsidiarily, the apparatus comprises, downstream of the third device or rotor, with respect to the flow of the mixture, a fourth device constituted by an action turbine whose section is adapted to this particular helical flow in order that the latter becomes substantially axial, the vanes also channeling the residual traces of heavy phase towards the periphery.

Moreover, at least certain of the above-mentioned devices are coupled together and connected to a common device for driving them in rotation.

According to a particularly advantageous, but non-limiting embodiment, the third device, or rotor, comprises at least two coaxial plates of revolution, spaced apart from each other and defining openings which extend from the center towards the periphery, are separated, for the same plate, by solid parts and, seen in plan view, are offset angularly from one plate to the following; according to the invention, the edges of the openings of the rotor strictly define the envelopes of the multiple running helical streams and, concomitantly, those of the fluid layers which separate them; the angular offset of the plates, the spaced-apart relationship thereof and the shape and size of the openings are chosen to determine with precision the relative inclination of said streams (i.e., their inclination relative to the rotor when it rotates) and thus the separating power and rate of flow of the apparatus; protuberant elements such as raised edges, ribs or the like, known per se, fastened with the solid parts, project exclusively in the fluid layers, on the one hand to define the edge of the running streams, and, on the other hand, to confine the or each heavy phase which escapes from the latter into said fluid layers and to guide it positively towards the periphery.

In this preferred embodiment, the second device, or rotary distributor, comprises at least two coaxial plates of revolution, spaced apart from each other and defining openings which extend from the center to the periphery, are separated, for the same plate, by solid parts and, seen from plan view, are offset angularly from one plate to the following; according to the invention, these openings of the distributor are each bordered by a single raised edge or blade projecting on the upstream face of the adjacent solid part, with respect to the flow of the mixture, and to the rear, with respect to the rotation of the plates, or, in equivalence, of the downstream face and at the front.

The invention will be more readily understood on reading the following description with reference to the accompanying drawings.

BRIEF DESCRIPTION OF THE DRAWINGS

FIGS. 4–10 are sections taken concentrically with respect to the axis of rotation and developed flat, demonstrating the process of the invention for various embodiments of the rotor and sometimes of the rotary distributor.

FIGS. 11 and 12 are views similar to FIGS. 4 and 10, relating to particular embodiments of the rotary distributor and the action of the turbine, respectively.

FIGS. 13 and 14 are partial plan views of a plate, illustrating several possible forms of the openings.

DETAILED DESCRIPTION OF THE INVENTION

Figure 1:
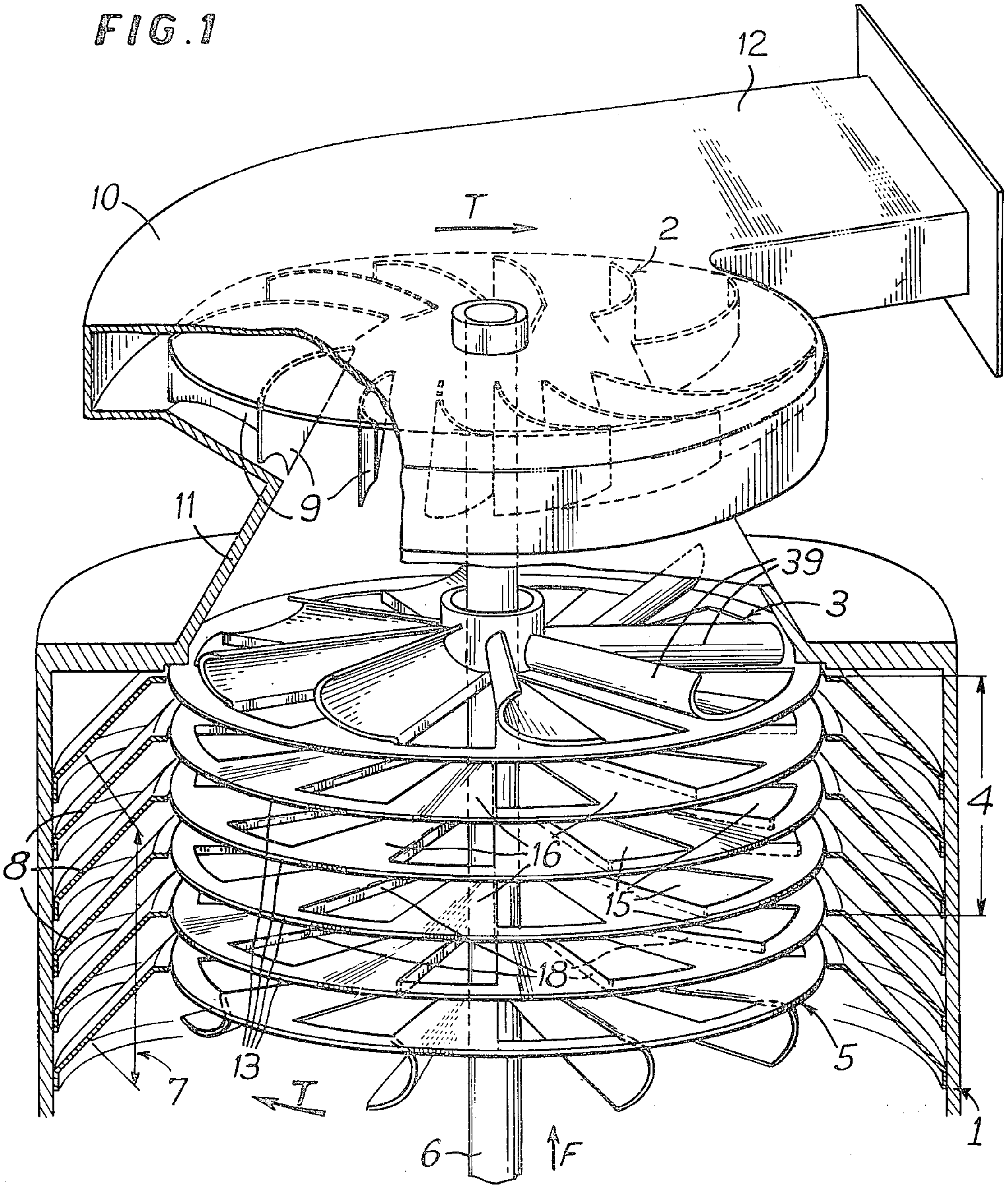
FIG. 1 is a perspective view with parts torn away, showing a first embodiment of the centrifugal apparatus according to the invention.

Referring to the drawings, FIG. 1 shows the apparatus according to the invention which comprises a fixed enclosure 1 in which the following are disposed coaxially and moved in rotation, from downstream to upstream with respect to the direction indicated by the arrow F of the flow of the mixture to be treated:

a fan 2;

an action turbine 3;

a rotating element or rotor 4;

a rotary distrubutor 5.

In the example shown, these devices 2 to 5 are moved positively and in synchronism; consequently, they are fixed on the same shaft 6 which may be coupled, at one end or at the other, to any device for rotating it, suitable for running of the apparatus. This is not a necessary step, as it is quite possible to envisage rotating the fan 2 positively at a different but adapted speed; it is also possible to provide a positive drive for one or two devices only (the rotor 4 and the distributor 5, for example) and a floating assembly for the other or others (for example, the action turbine 3).

Furthermore, the axis of rotation is vertical in the drawing, but it may also be horizontal or inclined.

The enclosure 1 contains a collecting element 7 which concentrically surrounds the rotating element 4 and possibly the distributor 5 to collect the or each heavy phase which arrives at the periphery. In the example shown, the element 7 is laminated and constituted by a stack of truncated rings 8 spaced apart from one another.

The fan 2 is intended to create a pressure drop upstream and a flow of mixture to be treated downstream, particularly through the rotating element. In the example shown, the fan is of the centrifugal type, its rotary blading 9 is suitably fixed to the drive shaft 6 and is housed in a casing 10 fixed to a convergent connection 11 of the body of the enclosure 1; the tangential pipe 12 of the casing enables the treated mixture, containing no heavy phase, to be evacuated.

It is obvious that the fan may be of another type, axial in particular, and that it may be replaced by a compressor disposed upstream; similarly, if the mixture, instead of being gaseous, is liquid, a suction or delivery pump may be used.

The upstream drop in pressure which results from the downstream axial suction or the upstream axial delivery is converted by the rotary distributor 5 into a helical speed of which the tangential component is added to the tangential speed of the rotor and of which the axial component creates the rate of flow.

Figure 2:
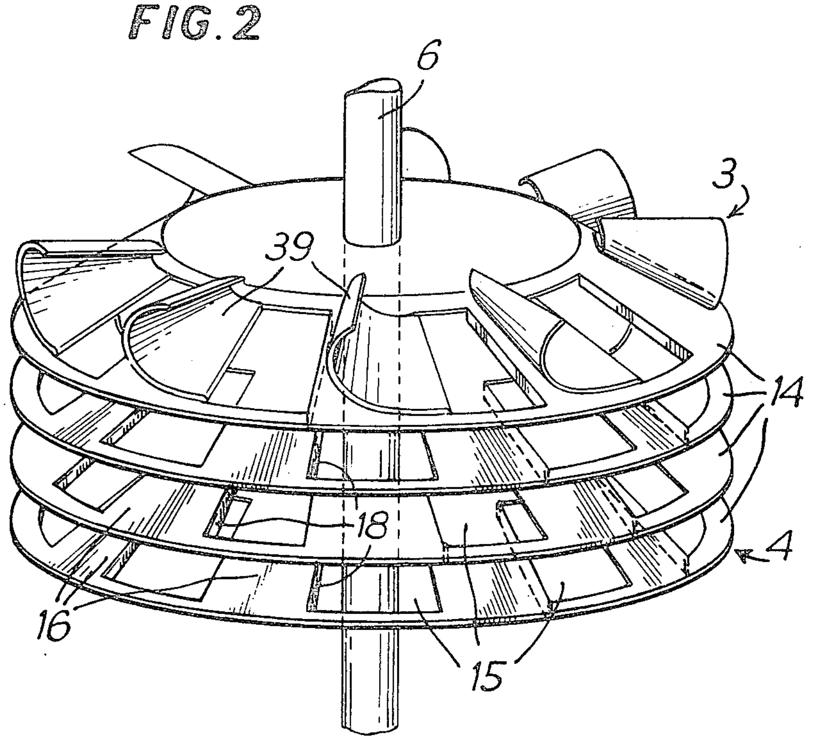
FIG. 2 is a partial perspective view similar to FIG. 1 and illustrating a second embodiment of the apparatus.

According to the embodiment shown in FIG. 1, the rotating element or rotor 4 is constituted by a stack of flat circular plates 13, and according to the embodiment shown in FIG. 2, this rotor is constituted by a stack of truncated plates 14.

The means described hereinbelow with regard to the embodiment of FIG. 1, in which the generatrices of the plates 13 are straight and perpendicular to the axis of rotation, are obviously applicable to the embodiment of FIG. 2 and to others, in which the generatrices may be curved and, if they are straight or curved, concurrent with or out of true with respect to the axis of rotation with any angle of incidence. In other words, the plates may be regular surfaces, such as conical surfaces, or any balanced surfaces of revolution, which cannot constitute a major difficulty in execution since the plates may, due to the reduced stresses which they undergo which the specification will demonstrate, be manufactured by moulding or even be in plastic material.

Figure 3:
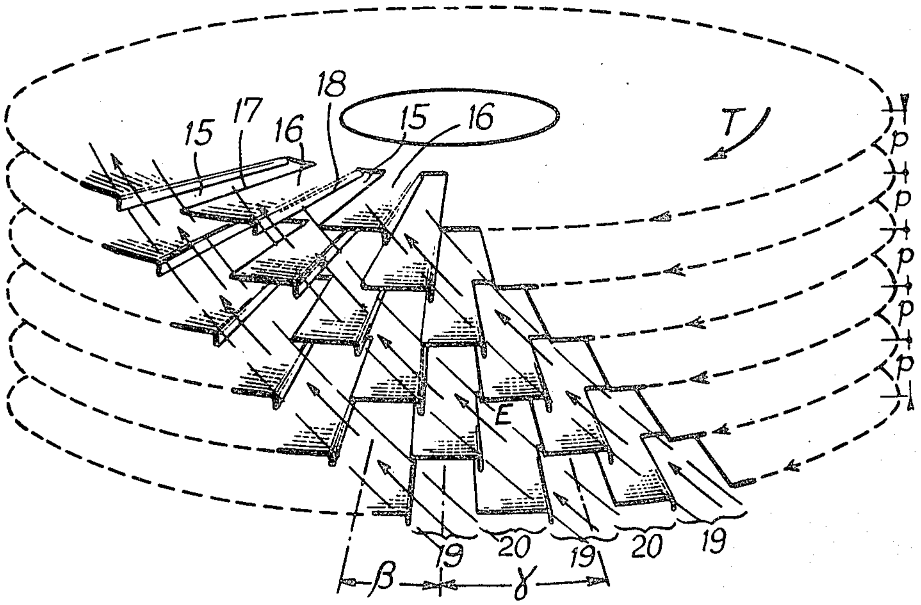
FIG. 3 is a very schematic view demonstrating, for a first embodiment of the rotor, the process of the invention.
Figure 5:
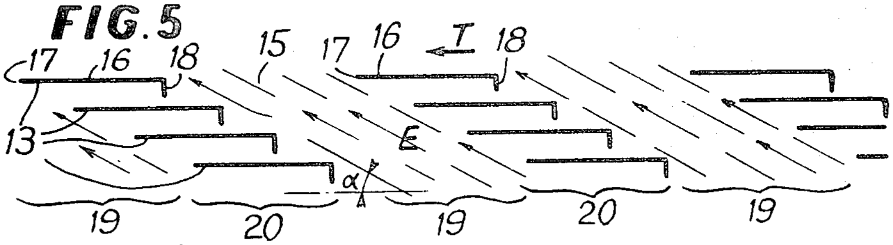

In the example with reference to FIGS. 1, 3 and 5, the plates 13 are spaced apart from one another at a constant pitch "p". Each plate 13 defines openings 15 distributed equiangularly, extending from the center towards the periphery and separated by solid parts 16. In the example shown, each solid part marks by its front edge 17 and by its rear edge 18, with respect to the direction of rotation T of the plates, the limits of the two adjacent openings; as said limits are radial, said openings and said solid parts are trapezoidal in form.

It is essential to note that the plates 13 are offset angularly one with respect to the following or to the preceding, by an angle $\beta$ (FIG. 3), so that corresponding openings are no longer located opposite one another, but gradually define helical envelopes of privileged inclination "$\alpha$" with respect to the rotor (FIG. 5). Within such virtual envelopes, running helical streams 19 of the mixture to be treated flow, if they are rendered at suitable speed by the rotary distributor 5. Outside these virtual envelopes, helical fluid layers 20 dwell with a low rate of renewal and are located between the rotating element adjacent to the solid parts 16 of the plates.

While the theory and principles involved are extremely complex, in the interest of clarity of terms, a brief discussion of the fluid mechanics associated with the flow of fluid through the apertures 16 will now be presented.

As a fluid flows through an opening (assumed to be well rounded for discussion purposes, but the apertures need not be so formed), there will be a jet stream formed downstream of that opening. As is well known, this jet stream assumes a shape which is determined according to opening and fluid variables. In fact, the fluid jet contracts, and at a particular location downstream of the opening, a section known as the vena contracta occurs. There will also be a wake defined behind the solid or non-apertured portion of the plates. The opening can be an orifice, or converging nozzle, or the like. Flow patterns in the wake are quite complex and involve rotational flow, vortex formation, separation and the like.

This discussion is presented to clarify the definition of "boundary" as used herein. The "boundary" of a helical path is thus influenced by the form of the fluid jet flowing from each aperture. The placement of the plates, or other surface defining means, with respect to each other (i.e., the pitch p), aperture size, location and orientation on the plates of the apertures influences the inclination, shape and size of each helical path by defining those parameters of the jets located adjacent to the apertures. Thus, the three-dimensional boundary of each helical path is defined by the apertures, and the location, size and orientation thereof.

As used herein, the term "boundary" is as above defined.

Due to the existence of the plates in the flow through the device, flow through the apertures will be strongly influenced, and, as above discussed, will define helical paths. There will be significant differences in flow velocity within the helical paths and within the regions adjacent to these helical paths (in fact, as will be evident from this disclosure, viewing the zones adjacent to the helical path as having no fluid flow can be proper). At any rate, as the fluid flowing through the device has a finite viscosity, a boundary layer can be envisioned as being defined between the fluid flowing in the helical path and that fluid located adjacent to that fluid flow path. As boundary layer theory is generally associated with fluid flow past solid boundaries, there are many problem areas involved in applying such theory to the flow of fluid in the present device. However, in the interest of clarity, it is helpful to apply the general concepts of boundary layer theory to the present device. It is noted that the exact theory propounded is not intended to in any way limit or influence the present invention and the scope thereof. It is presented as a means of clarifying the terms used herein. Boundary layer flow is extremely complex and attention is directed to textbooks such as *Mechanics of Fluids,* by Irving Shames, McGraw-Hill, 1962 and/or *Boundary Layer Theory,* by H. Schlichting, McGraw-Hill Book Co. for further discussions of boundary layer theory.

Using the above discussion, the helical path can be envisioned as existing adjacent to a zone of other fluid and being defined by a boundary established according to fluid flow mechanics associated with the flow of fluids through apertures. As above discussed, the spacing of the plates, the orientation of the apertures on the plates (i.e., the slope of such apertures with respect to the plates), and the like determine the shape and inclination of the helical path, and hence the boundary of that path. Those skilled in the art will be able to establish such parameters based on the disclosure presented herein.

It is also to be noted that while the form of the invention disclosed herein has a plurality of apertures in each plate to define a plurality of helical paths, such disclosure is not to be considered as limiting. A single aperture in each plate can be used to define a single helical path if so desired. Furthermore, plates per se need not be used, as any surface defining means can be substituted for the plates. Furthermore, while the device disclosed herein envisions rotating the plates, the helical path (or paths) and the multiple centrifugal separation aspects of this disclosure can be produced using non-rotating plates with the fluid flowing past such stationary plates if suitable.

The angular offset of the apertures in adjacent plates can be adjusted to place the non-apertured areas 16 of each plate in a wake established by the non-apertured area of an upstream adjacent plate. The above-discussed zone surrounding the helical path would thus be located in such wake.

The helical path, or paths, established by the fluid flowing through the angularly offset apertures is continuous and uninterrupted and extends for a substantial length of the housing or enclosure. By "continuous" it is meant that there are no discontinuities or other such abrupt changes in the path. The angle $\alpha$ can change as the flow proceeds through the housing, but such change must be gradual and gentle or there will be a discontinuity in the helical path which may induce turbulence in the zone adjacent to such path. Such turbulence is undesirable.

According to the process of the invention, the rotor 4 thus constituted actually divides the mixture to be treated into a plurality of intermediate helical zones 20. The zones are located outside of the helical path and are between portions of the plates. The running streams passing through this rotor following such helical paths flow at an absolute tangential speed obviously greater than that of said rotor, while the fluid in the zone moves substantially at the tangential speed of the rotor.

Under these conditions, it is observed that for a rotor rotating at the angular speed "w", the absolute tangential speed of a particle located at a radial distance R is:

$\omega R$ if this particle is in a zone layer, $\omega R+V_T$ if this particle is in a running stream advancing with respect to the rotor at the relative substantially constant tangential speed "$V_T$", with $V_T=k/R$.

Consequently, the centrifugal force of such a particle is:

$F_{CH}=\omega^2 R$ in a still layer and $F_{CV}=(\omega R+V_T)^2/R$ in a running stream.

It is clear that the centrifugal force $F_{CV}$ in the running streams 19 develops as a function of the radii. The centrifugal force is very intense at the center; it decreases up to the point where it reaches its minimum; then it increases again up to the periphery where it may reach extremely intense values.

This phenomenon, and the results set forth hereinafter which follow therefrom, are unforeseeable and unexpected in conventional centrifugation. Experimental facts based on the process and the apparatus of the invention corroborate the veracity of the results obtained.

In fact, it is verified that the heavy particles of the running streams 19 subjected to a very intense centrifugal force precipitate towards the periphery, decelerating and agglutinating before arriving at the annular zone of minimum force, then, from this zone, accelerate again in greater masses towards the periphery. However, in the course of this centrifugal displacement, the heavy particles migrate, for various reasons, towards the zone layers 20 in which they are picked up; they are then taken over by a centrifugal force, which is weaker but sufficiently high to guide them ineluctably towards the periphery in the course of this flow, conducting elements, defined hereinafter, oppose the escape of the heavy particles towards the running streams and participate positively in their flow towards the periphery where they precipitate in the truncated rings 8 of the collecting element 7 which subtract them definitively from the mixture.

The absolute tangential velocity in the running streams exceeds the absolute tangential velocity of the fluid located in the still zones, and thus, the centrifugal force exerted on the fluid located in the running streams exceeds the centrifugal force exerted on the fluid located in these zone layers. There will be centrifugal force exerted on any heavy particles located in the zones due to the rotation of the plates with respect to the fluid, and thus centrifugal separation will occur in the zones as well as in the running streams. A plurality of centrifugal separations thus occurs.

It is obvious that the angular offset "$\beta$" of the plates 13 and the spacing "p" thereof (FIG. 3), as well as the shape and dimensions of the openings 15, are chosen to determine with precision the relative inclination "$\alpha$" of the running streams 19 (i.e., their inclination with respect to the plates 13 when they rotate). The parameters in question therefore make it possible to regulate the separating power and the rate of flow of the apparatus. In general, these parameters are constant for a determined apparatus, but it may be advantageous to vary them from upstream to downstream as a function of the functioning of this apparatus and of the treatment to be obtained.

In any case, the choice of said parameters makes it possible, in relation with the running of the apparatus and the composition of the mixture, to define the privileged helical flow of the running streams through the openings 15 of the rotor. Thus, each stream taking an opening "n" of the plate may continue its flow, passing through the homologous opening "n" of the following plate, i.e., the one offset downstream and at the front by the angle of offset "$\beta$" of the plates (FIG. 3); however, each stream may also miss out one or more openings, the following opening (n+1), (n+2) . . . then being offset downstream and at the front with respect to the reference opening "n" by an angle $(\beta+\alpha)$, $(\beta+2\alpha)$ . . . , $\alpha$ being the angular pitch of the openings on the same plate (FIG. 3).

The rotating element or rotor 4 functions in the manner set forth hereinabove, due to the presence of the rotary distributor 5; it is recalled that this distributor, by converting the upstream pressure drop into a helical speed of the mixture directs the running streams of the latter towards the selected envelopes of the openings in the plates. Consequently, the relative speed of rotation of the streams due to this action is added in the same direction to the positive speed of rotation of the distributor which is that of the rotor.

According to the embodiment shown in FIGS. 1 and 11, the distributor 5 comprises a plate 13 with openings 15 and solid parts 16 offset in register with those of the plates of the rotor 4. This particular distributor is an impeller constituted by a plurality of vanes 21 whose concavity opens downwardly of the flow of the mixture in the direction of arrow E. The trailing edge 22 of each vane coincides with the edge 17 of the solid part 16 which defines the opening 15 in which the vane in question opens; moreover, this trailing edge 22 is inclined along the relative inclination "$\alpha$" of the running streams 19. Consequently, the vanes are advantageously fastened with at least certain of the solid parts, generally with all of them since they are preferably equal in number. The curvature of the concavity 23 and the shape of the leading edge 24 are established as a function of the aero- or hydrodynamic characteristics of the mixture and of the operating conditions.

The foregoing specification refers to the launching by the distributor 5 and to the helical guiding of the running streams 19 through the openings 15 of the rotor 4. The following specification now concerns the stabilization of the zone layers 20 in the helical intermediate spaces made between the solid parts 16 of the plates of the rotor, the picking up of the heavy particles coming from the running streams in the layers, the positive guiding of the heavy particles from the zone layers towards the periphery.

To obtain these combined results, a plurality of embodiments, illustrated in FIGS. 4 to 10, may be employed.

Figure 4:
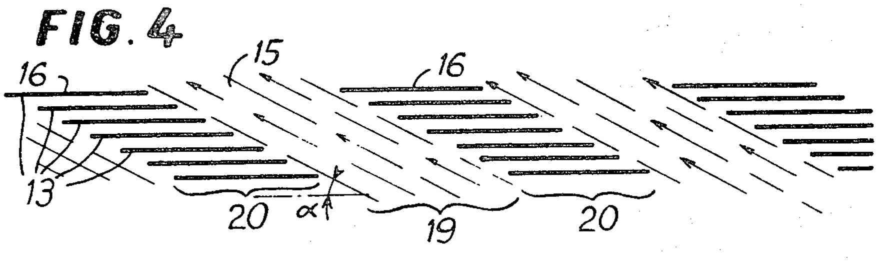

According to the simplified embodiment of FIG. 4, the plates 13 are smooth and very close to one another. As the mixture to be treated has a certain viscosity, at least the solid parts of the plates 13 have a surface state suitable for a certain adherence of this mixture, and as the flow E of said mixture is made at a sufficiently high speed to create a boundary layer opposing the remix of the contents of the zone layers with the contents of the running streams, while allowing the heavy particles of the latter to penetrate in said zone layers, these zone layers are really imprisoned between two consecutive solid parts 16. The heavy particles located in these layers are guided quite naturally through them under the effect of the centrifugal force of the rotor towards the periphery.

Such an embodiment (FIG. 4) is applicable to the separation of extremely fine particles, which may go as far as molecular separation.

When the plates 13 are spaced further apart from one another, for any reason, the results intended are obtained by providing protuberant elements, such as raised edges, ribs or the like, made fastened by any suitable means with the solid parts 16 of the plates. It is essential to note that these protuberant elements project solely in the layers 20 and must not appear in the least in the running streams due to induced turbulence. The protuberant elements cooperate with the solid parts 16 to maintain the zone layers 20 associated with the rotor, to confine in these layers the heavy particles which escape from the running streams and to positively guide said particles towards the periphery.

Such protuberant elements are illustrated in FIGS. 5 to 10.

According to a first embodiment of this type shown in FIG. 5 and already evoked with reference to FIGS. 1 to 3, each solid part 16 of a rotor plate 13 comprises one marginal raised edge 18 which projects on the upstream face of this solid part (with respect to the flow E of the adjacent running streams 19) and to the rear (with respect to the rotation T of the plates).

Figure 6:
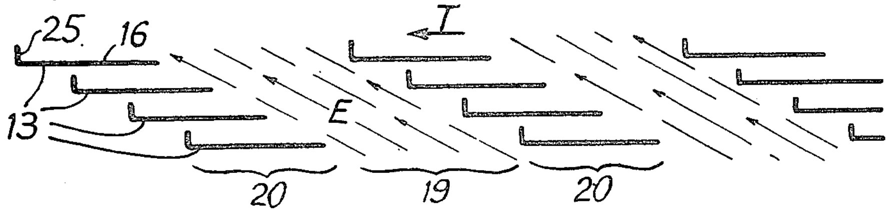

According to a second embodiment equivalent to the first and shown in FIG. 6, each solid part 16 comprises one marginal raised edge 25 projecting on the downstream face (with respect to the flow E of the running streams 19) and at the front (relative to the direction of rotation T of the rotor).

According to a third embodiment combining the two preceding ones and shown in FIG. 7, each solid part 16 comprises a raised edge 18 projecting upstream to the rear and a raised edge 25 projecting downstream at the front.

FIGS. 5 to 7 show that the raised edges 18 and 25 may be perpendicular to the solid parts 16 of the plates. However, it is clear that they can be replaced, partly or totally, by inclined raised edges 18*a* and/or 25*a* (FIG. 9). The solid parts 16 of the plates 13 may also be bordered by inclined raised edges 18*b* and 25*b* (FIG. 10), of which the inclination is equal to the inclination "$\alpha$" of the running streams with respect to the rotor.

According to the embodiment shown in FIG. 8, each solid part 16 of the plates may comprise at least one intermediate rib 26 and/or 27 projecting on its upstream face and/or on its downstream face in the coresponding layers 20 and between the two adjacent openings.

The raised edges and ribs mentioned above, whether they are perpendicular or inclined, may be combined together in various arrangements, as long as there is no protuberance in the running streams and the existing protuberances define the fluid (or zone) layers, then trap and channel the heavy particles.

The foregoing specification relates to the shape of the stacked plates of the rotor 4. However, it is obvious that the rotary distributor may have a similar shape instead of the one with vanes described with reference to FIGS. 1 and 11. Simply by way of example, the rotary distributor may thus comprise at least two plates with any one of the sections of FIGS. 5 to 7 or at least one plate with the section of FIG. 10; in this case, the plates in question constitute the first state of the rotor 4 assimilable to imaginary vanes.

The means employed for ensuring that the particles subjected to the very intense forces which prevail in the running streams 19 escape and migrate from these latter towards the layers will now be set forth. Firstly, it is important to note that it is possible to reduce the length of travel of the heavy particles from the center towards the periphery in a running stream 19, by modifying the shape of the cross-section of the stream in question, which cross-section depends on the shape and orientation of the openings which define the envelope of said stream.

Consequently, with reference to the embodiments illustrated in FIG. 13, the openings 15 may be, as indicated at:

28, trapezoidal windows whose large base is near the periphery and whose small base is near the center (shown in solid lines),

29, trapezoidal windows whose large base is, on the contrary, near the center and whose small base is near the periphery (shown in broken lines),

30, narrow windows with substantially parallel edges (shown in dashed and dotted lines).

In all cases, the openings extend without interruption from the center towards the periphery and are limited by rectilinear edges; however, it is obvious that the edges in question may be zig-zag form or curved according to the law of trapping which appears necessary.

On the other hand and still with reference to FIG. 13, the openings may be radial (shown in dashed and dotted lines) or they may be inclined in rectilinear or curvilinear manner so that their peripheral end is in advance (shown in solid lines) or lagging (shown in broken lines) with respect to their central end, if their direction of tangential advance T is considered.

The foregoing examples show that the inclination, width and shape of the openings enables the time for collecting the heavy particle by the fluid (zone) layers to be determined with precision.

In certain cases, and particularly when the diameter of the plates is relatively large, it is advantageous to reduce the radial extent of the openings. To this end, and as shown in FIG. 14, openings 31 or 32 of small length are distributed in a plurality of concentric annular zones 33 to 36.

In the embodiment illustrated by the left-hand half of FIG. 14, the openings 31 are slots with parallel edges which present, from one area to the following in the same plate, a substantially constant average width and spacing. The density of distribution of the running streams is substantially uniform and the time for collecting the heavy particles is reduced as a central deflector 37 extending the marginal raised edges 38 opposes the remix of the heavy particles escaping from the running streams of one annular area with the running streams of the adjacent outer concentric area; on the contrary, the deflectors in question direct the escaping heavy particles towards the fluid layers of the outer annular area in question.

In the embodiment shown in the right-hand half of FIG. 14, the openings 32 are trapezoidal windows which, from one area to the following in the same plate, are located on common radii, whether they merge with the latter, or whether they form a positive or negative angle of incidence; the average width and spacing of these windows increases from the center towards the periphery, on passing from one annular area to the following one. As in the preceding case, the raised edges 38 of the windows present central deflectors 37 opposing the remix of the separated heavy particles.

It is obvious that the openings may be distributed in overlapping annular areas, in order to render their density more uniform and avoid the risks of remix.

On leaving the openings 15 of the last downstream plate of the rotor 4 the running streams 19 composed of the treated mixture containing no heavy particles tend to continue their flow along the above-mentioned helical paths.

Now, the process of the invention provides straightening up these helical flows to convert them at the outlet of the rotor 4 into an absolute axial flow towards the fan 2. Such an arrangement is particularly advantageous since the kinetic energy of rotation of this treated mixture may easily be recovered to rotate the coupled device 2, 4 and 5 and thus reduce the power consumed.

To this end, the last downstream plate of the rotor 4 is fast with the action turbine 3 whose section is adapted to the particular helical flows mentioned hereinabove for them to become substantially axial.

Figure 12:
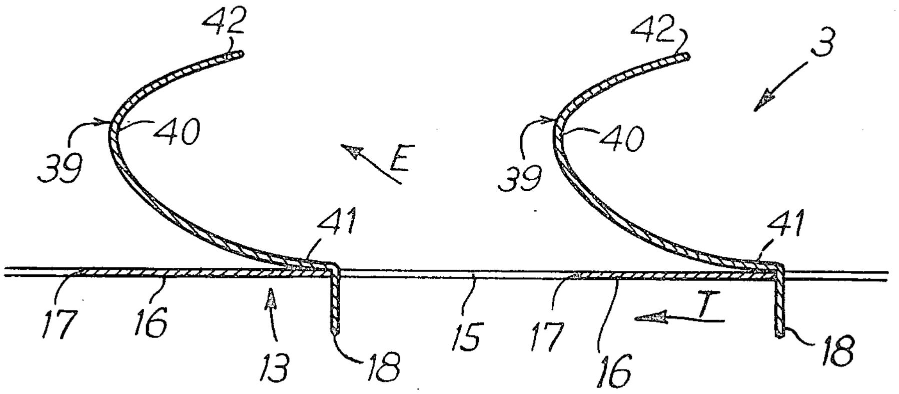

In the embodiment shown in FIGS. 1 and 12, the action turbine 3 comprises a plurality of vanes 39 of which the concavity 40 opens upstream of the flow of the mix in the direction of arrow E. The leading edge 41 of each vane coincides with the rear edge or raised edge 18 of the solid part 16 with which the vane in question is fast and which defines the opening 15 in which said vane opens; moreover, this leading edge 41 is inclined in the relative inclination $\alpha$ of the running streams 19. Of course, the curvature of the concavity 40 and the shape of the trailing edge 42 are established as a function of the aero- or hydrodynamic characteristics of the mix and the operating conditions.

Furthermore, the shape of the vanes 39 is such that they channel the residual traces of heavy phase towards the periphery where said vanes are open.

The foregoing specification shows that the aero- or hydrodynamic flow of the mix through the apparatus undergoes, between upstream and downstream, an increasing variation in speed; consequently, an expansion occurs quite naturally within the rotor and consequently a drop in temperature which may be used for condensing a vapor phase in the course of separation.

The invention is not limited to the embodiments shown and described in detail hereinabove, as various modifications may be made thereto without departing from the scope thereof.

The process and apparatus forming the subject matter of the invention may be used for separating a mixture of phases of any states.

More particularly, they are applicable to the elimination of oily mists, such as those produced by machine tools, presses, certain heat treatment furnaces, to the elimination of solvent mists in baking ovens or in coating stations for example, to the elimination of aqueous mists possibly laden with lye and other toxic product, to the thorough washing of dust-laden gas with a small quantity of water . . . , to the extraction of trace of light liquid pollutant in aqueous phases such as residual water from oil refineries, to the thorough clarification of liquid phases laden with heavy pollutants.

I claim:

1. A centrifugal separating apparatus for separating a heavy phase from a light phase in a fluid mixture of such phases comprising:

a housing having an outlet;

a plurality of apertured spaced apart plates with the apertures of each of said plates having at least one lateral edge and being located on said each plate to be positioned thereon with respect to apertures in adjacent plates to locate those apertures on at least one uninterrupted, continuous helical path extending through said plates for substantially the entire length of said housing;

means for feeding a fluid mixture of light and heavy phases to said housing for separating said heavy phase from said light phase;

mixture moving means for moving said fluid mixture through said housing and through said apertures of said plates to flow from one aperture to an adjacent aperture along said uninterrupted, continuous helical path on which said apertures are located with flow along said helical path creating a helical path centrifugal force on fluid flowing along said helical path which is in excess of any centrifugal force exerted on any fluid flowing in said housing outside said helical path, said helical path centrifugal force creating a centrifugal separation of heavy phase from light phase in fluid flowing along said helical path to separate heavy phase from light phase and cause separated heavy phase to exit from said helical path, said plates each having means for contacting heavy phase exiting said helical path and preventing such exiting heavy phase from moving toward said housing outlet and guiding such exiting heavy phase under the influence of the centrifugal force existing outside said helical path toward said housing and a central deflector mounted on the plates adjacent to each aperture lateral edge and wherein each opening is defined to present at least one lateral edge extended by the central defector with fluid forces in the fluid flowing along said helical path preventing said exiting heavy phase from re-entering said helical path;

a heavy phase collecting means fluidly connected to said housing to collect said exiting heavy phase guided thereto by said plates and the centrifugal force exerted on fluid located outside said helical path; and a light phase discharge means fluidly connected to said helical path to collect light phase which has followed said helical path through said plates.

2. The centrifugal separating apparatus defined in claim 1 further including protuberant elements mounted on said plates and wherein said protuberant elements are located on a leading edge of an aperture.

3. The apparatus of claim 1, further including vanes attached to one plate to have a leading edge of each vane fastened with a last downstream blade, said vanes limiting the size of the apertures in said one plate.

4. The apparatus of claim 2 wherein the apertures of the plates are each bordered by two raised edges, with one edge projecting upstream of the mixture flowing through said housing and the other edge projecting to the rear and downstream with respect to the flow of the mixture.

5. The apparatus of claim 4 wherein the raised edges are substantially perpendicular to the plate on which they are mounted.

6. The apparatus of claim 5 wherein the raised edges are inclined with respect to the plate.

* * * * *